Figure 1:
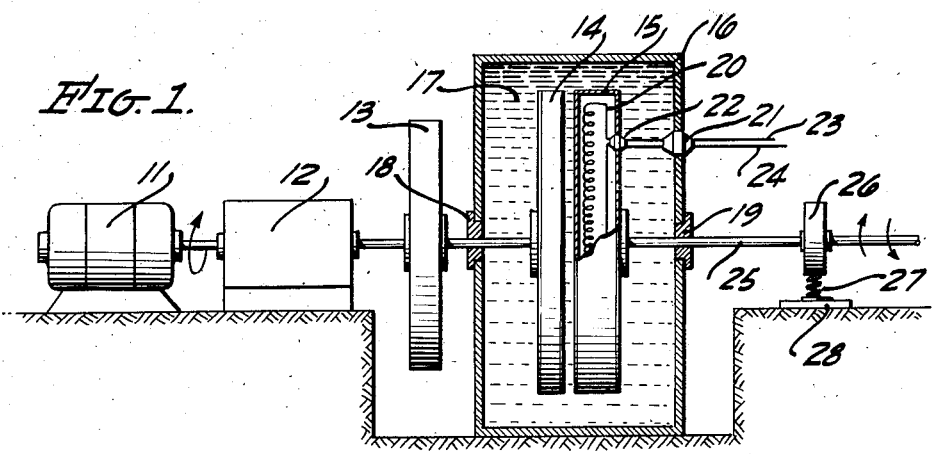

Sept. 17, 1957 R. N. FLECK 2,806,533
VIBRATIONAL WAVE GENERATOR
Filed Nov. 10, 1949 2 Sheets-Sheet 1

INVENTOR.
RAYMOND N. FLECK.
BY Ross J. Garofalo
ATTORNEY.

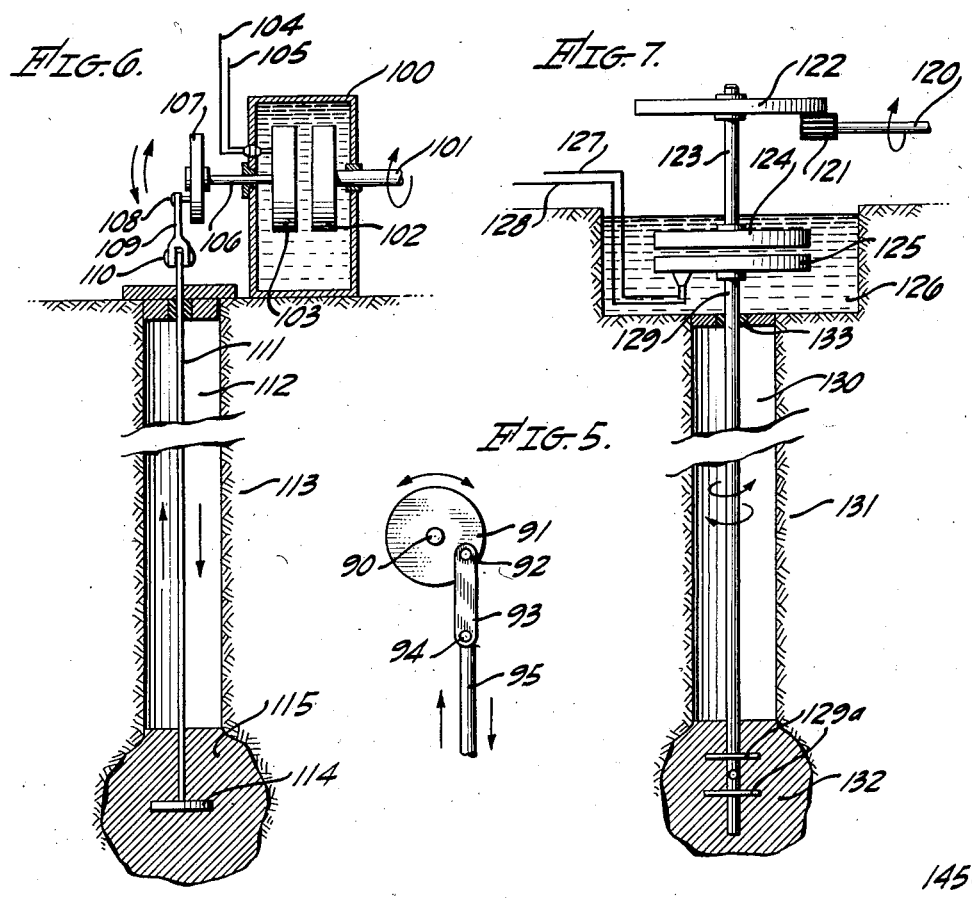
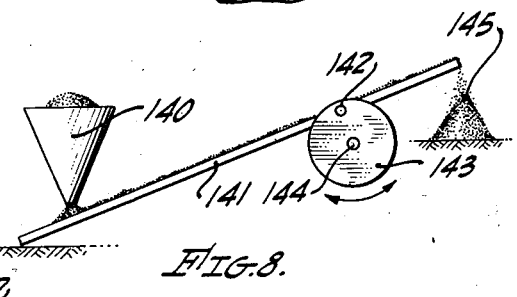
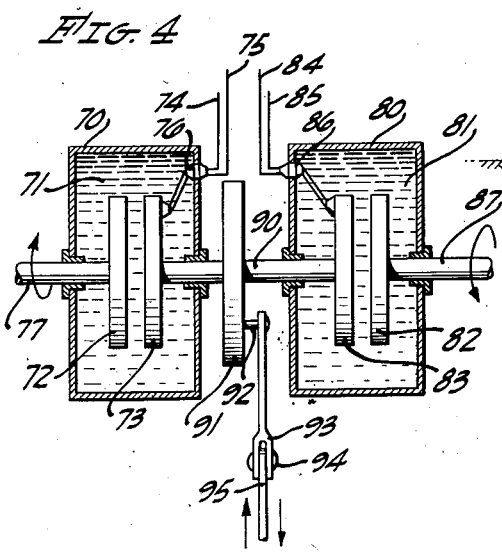

2,806,533
Patented Sept. 17, 1957

United States Patent Office

2,806,533
VIBRATIONAL WAVE GENERATOR

Raymond N. Fleck, Long Beach, Calif., assignor to Union Oil Company of California, Los Angeles, Calif., a corporation of California Application November 10, 1949, Serial No. 126,523

9 Claims. (Cl. 166—45)

This invention relates generally to vibrational energy generators, and more particularly to a method and apparatus for the generation of such energy, wherein a magnetic fluid clutch is employed alternatingly to couple and uncouple a continuously rotating prime mover with the load to be vibrated. The invention further relates to methods and apparatus for using the vibrational energy generated thereby.

In general, the generation of extremely high powered vibrational waves is a serious problem for those uses in which the energy requirements are appreciable, such as in shaking oil-bearing formations and the like. In the generation of low frequency, high energy, compressional waves the rotation of heavy eccentrically mounted weights is generally employed to establish the frequency of the vibration and the frequency thereof is limited to a low upper limit for physical reasons. As the energy requirements of such generators is increased, the size of equipment required increases enormously. In an alternative method for the generation of such waves, electrical or magnetic energy is employed to actuate magnetostrictive or piezoelectric devices. In either case the mechanical energy output of the compressional wave generator is derived entirely from the electrical energy of the alternating current supplied to the magnetostrictive or piezoelectric unit. Moreover the frequency of the alternating current supply must be equal to, or a simple multiple or submultiple of the frequency of the compressional wave energy. The generation of large amounts of high frequency electrical energy is extremely expensive. Furthermore the generation of asymmetric compressional waves by these methods is both difficult and expensive.

It is an object of this invention to provide a method and apparatus for vibrating a load by the laternate coupling and uncoupling of a continuously rotating source of mechanical energy through the medium of a magnetic clutch.

It is another object of this invention to generate compressional wave energy by impressing a periodic magnetic wave form upon the fluid medium in the interspace of a magnetic fluid clutch, wherein the clutch acts alternately to couple and uncouple energy from a continuously rotating prime mover to a resilient loading.

It is another object of this invention to employ two magnetic clutches whose secondary discs are each coupled to the same resilient load and each of whose primaries are coupled to rotating sources of mechanical energy, each clutch tending to make the resilient load rotate in an opposite direction of the other and impressing a separate magnetic wave form upon each of the two clutches wherein the phase angle between the two magnetic wave forms is such as to cause the two clutches to be alternatingly engaged.

It is another object of this invention to impress a periodic electrical current of symmetrical or asymmetrical wave form upon a magnetic clutch wave generator and to employ the vibrations generated thereby to vibrate an oil-bearing formation undergoing either primary or secondary recovery in order to increase the productivity thereof.

It is another object of this invention to employ a minor quantity of electrical energy to modulate the transmission of a major amount of mechanical energy through the medium of a magnetic fluid clutch wherein the transmission of the major quantity of energy is interrupted in a periodic manner corresponding to the periodic frequency of the minor amount of electrical energy, thus transmitting the mechanical energy as a series of impulses.

Briefly this invention relates to the use of a fluid magnetic clutch to modulate, or alternatingly couple and uncouple, a major source of energy such that the energy of the major source is transmitted intermittently through the magnetic clutch in the form of a regular series of impulses constituting vibrational mechanical energy. A minor amount of alternating electrical energy is employed to furnish a periodic magnetic field in the interspace of the magnetic clutch to effect the desired coupling and uncoupling.

In one modification of the invention the primary clutch plate of the magnetic clutch is rotated at a relatively uniform speed by means of any suitable prime mover such as an electric motor, an internal combustion engine, a steam turbine or the like. The primary clutch plate of the magnetic clutch is maintained in close spacial relationship to a secondary clutch plate, the latter being coupled to a resilient loading. In some cases the resilient character of the system is caused by a spring coupling while in other cases the resiliency is caused by the normal flexible character of the load being vibrated, such as when a long steel pipe or the like is vibrated. The two clutch plates or discs are bathed in a magnetic clutch fluid.

In general the clutch fluid comprises any suitable oil such as animal, vegetable or mineral oils, silicone oils and the like in which there is dispersed a finely divided highly permeable magnetic substance of low magnetic retentivity, such as powdered iron which is preferably very pure, alloys such as 4% silicon in iron, oxides and ferrites. A highly dispersed clutch fluid is prepared by selecting finely divided iron particles, or other such material, which preferably have a particle size average diameter of the order of 20 microns and intimately mixing such particles with the desired oil. Such mixtures possess the property of being only slightly viscous normally, but set up to a viscous liquid or pseudo-solid when they are subjected to the action of a magnetic field. The magnetizable solids of the clutch fluid normally comprise about 2 to 40 and preferably about 5 to 20 percent by weight of the clutch fluid with the higher frequency wave generators employing the lesser amounts of magnetizable solids in suspension.

The coupling and uncoupling of the prime mover to the resilient loading is effected by alternate magnetizing and demagnetizing of the magnetic clutch fluid. A suitable alternating magnetic field is generated by impressing an alternating electrical current upon an electromagnetic coil which is placed in close communication with the bathing magnetic fluid or which is preferably built into one or both of the clutch plates. Accordingly, when a magnetic field is established throughout the fluid, the secondary clutch plate tends to rotate in the same angular direction as the primary clutch plate being rotated by the prime mover. After the secondary clutch plate has been rotated through small angular displacement the magnetic field is collapsed thereby releasing the secondary clutch plate from further angular pull of the primary clutch plate. The small rotational displacement of the secondary clutch plate effects the loading of springs, or the equivalent thereof. During the period of the coupling the springs store potential energy which energy opposes the rotation. Upon the release of the displacing force by the collapsing of the magnetic field, the potential energy of the springs returns the secondary clutch plate through a small angular displacement in a direction counter-rotational-wise to the angular motion of the rotating primary clutch plate.

In another modification of the invention prime movers are employed to rotate the primaries of two magnetic clutches while the secondaries of the clutches are mutually coupled to the same resilient load. The rotation of the primaries of the magnetic clutches is such that when either is coupled to the load it tends to move the load opposite to the tendency of the other prime mover source. In the operation of the system each of the electromagnets in conjunction with each of the magnetic fluid clutches is activated with its separate periodic electric current so that the two resulting magnetic fields are out of phase by an angle of about 180°. Under such circumstances only one clutch can be connected to the load at any given instant. The first secondary clutch plate and the attached load is moved first through a first small angular displacement whereupon the collapse of the magnetic field acting upon the first clutch releases the secondary clutch plate from further rotational pull. Simultaneously the rising magnetic field in the opposing clutch causes the second secondary clutch plate and attached load to move through a second small angular displacement; thereafter, the collapse of the magnetic field acting upon the second clutch releases the secondary clutch plate from further rotation. By means of such coupling to the load, it is alternatively moved first in one angular direction and then in the opposite angular direction, which cycle is repeated numerous times per second, thereby generating pulsating wave form energy which is transmitted to the load.

The vibrational wave energy generated by the methods of this invention are especially well suited for the vibration of large objects, such as oil-bearing formations, which require exceptionally high energy levels to effect their movement. In the vibration of an oil-bearing formation or other such large object, according to the method of this invention, a relatively small amount of expensive electrical current is generated, which current, if single-valued, has the same frequency as that of the desired compressional wave energy and if double-valued is half the frequency of the desired compressional wave energy. This current is then fed to an electromagnet located in the interspace of a magnetic clutch, whereby a minor amount of electrical energy serves to modulate the transmission of a much larger amount of some less expensive, or more available form of mechanical energy which form it is desirable to use.

Figure 1 presents one method of generating vibrational wave energy wherein a single magnetic clutch coupling is employed.

Figures 2a, 2b, 2c, 2d, and 2e respectively present various wave forms of electrical current which may be employed in this invention to establish the required magnetic fields in magnetic clutch in order to generate wave energy.

Figure 3:
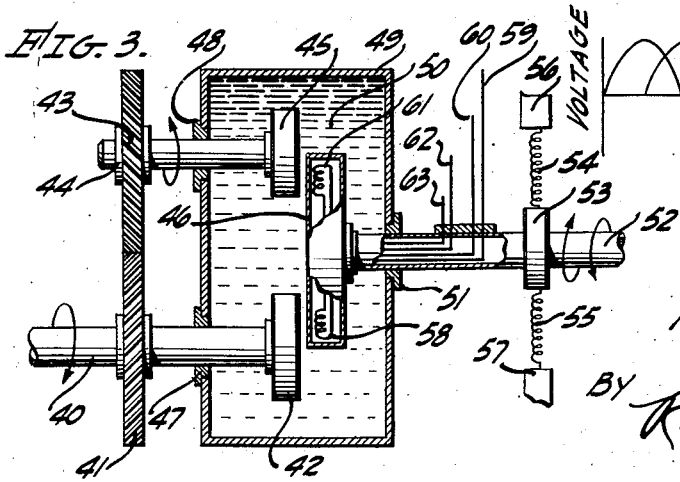
Figure 2E:
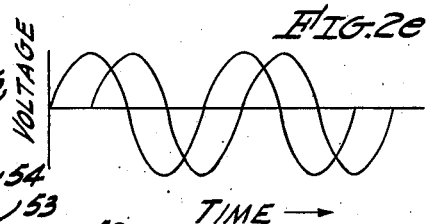

Figure 3 shows one method for coupling a prime mover to a wave energy consumer wherein opposed coupling means are employed first to couple the lead to a first rotating disc or clutch plate to rotate it through a small displacement in one angular direction and then to couple the load to a second rotating disc or clutch plate to move it in the opposite angular direction with sequence being repeated numerous times per second.

Figure 4 presents another modification of the invention wherein the load is coupled to two separate magnetic clutches so as to effect positive movement in both angular directions by means of the prime mover or prime movers.

Figure 5 shows a means for converting rotational wave energy to linear compressional wave energy.

Figure 6 presents one method for coupling a prime mover to an oil-bearing formation so as to vibrate the formation with a linear compressional wave form.

Figure 7 presents an alternative means for vibrating an oil-bearing formation by means of a magnetic fluid clutch wherein rotational wave form energy is employed to effect the vibrating.

Figure 8 presents a method for transferring solids employing an asymmetric wave energy form which is generated by a magnetic fluid coupling device.

Referring now more particularly to attached Figure 1, prime mover 11, which comprises an electric motor, an internal combustion engine, a steam turbine or the like, is suitably coupled to gear box 12 to reduce or increase the angular velocity according to the requirements of the particular case. The output of gear box 12 rotates large flywheel 13 and primary clutch plate 14 coupled thereto. Disc-shaped primary clutch plate 14 is in close spacial relationship to disc-shaped secondary clutch plate 15. Primary clutch plate 14 and secondary clutch plate 15 are mounted so that the primary clutch plate 14 is rotatable and secondary clutch plate 15 is partially rotatable, wherein the rotation and partial rotation have a coaxial relationship. The flat face of the primary clutch plate 14 opposes the corresponding flat face of the secondary clutch plate 15, wherein the two faces are separated by a small distance, the space therebetween herein being called the interspace. Primary and secondary clutch plates 14 and 15 respectively are housed in clutch box 16 which is filled with magnetic clutch fluid 17. The clutch fluid also fills the interspace between primary clutch plate 14 and secondary clutch plate 15. Secondary clutch plate 15 is coupled to partially rotatable shaft 25 which is in turn coupled to a suitable consumer of vibrational wave energy, such as to an oil-bearing formation in the manner described hereinafter. Shaft 25 is fitted with collar 26 to which is attached springs 27 which are in turn attached to rigid support 28. A small angular displacement of secondary clutch plate 15 in the angular direction of rotating primary clutch plate 14 stores potential energy in springs 27. The force of springs 27 opposes the concurrent rotation of the two clutch plates 14 and 15 and tends to restore secondary clutch plate 15 to its position prior to the angular displacement.

Electromagnetic coil 20 is embedded within or reposes within a hollow cavity of secondary clutch plate 15. The excitation of electromagnetic coil 20 by means of an electromotive force establishes a magnetic field, which is preferably uniform, throughout the interspace between the two clutch plate surfaces. Electrical leads 23 and 24 attached to electromagnetic coil 20 respectively, pass out of clutch plate 15 through insulator 22 through the interior of clutch box 16 to insulator 21 mounted in the wall of the clutch box and thence out of clutch box 16.

Figure 2A:
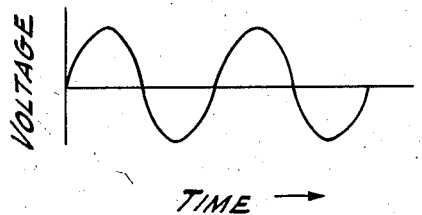
Figure 2C:

In the operation of the wave generator an alternating electrical current, having a sinusoidal wave form such as is shown in Figure 2a, is impressed upon leads 23 and 24 respectively of electromagnetic coil 20 whereby electromagnetic coil 20 is alternatingly energized and de-energized, thereby establishing and de-establishing a magnetic field in the interspace between clutch plates 14 and 15 respectively. During the interval in which a magnetic field exists between the clutch plates 14 and 15 respectively, the magnetic clutch fluid increases in viscosity and/or sets up to a semi-solid whereupon the rotation of primary clutch plate 14 by prime mover 11 is able to cause the partial rotation of secondary clutch plate 15 in the same angular direction as primary clutch plate 14. The partial rotation of secondary clutch plate 15 loads spring 27 thereby tending at all times to restore secondary clutch plate 15 to its original position prior to the partial rotation. The de-energizing of electromagnetic coil 20 by completion of a half wave of the alternating voltage causes the collapse of the magnetic field in the interspace and releases secondary clutch plate 15 from further angular rotation with primary clutch plate 14. Release of secondary clutch plate 15 from rotation with primary clutch plate 14 permits the restoring force of spring 27 to become effective and this force swings the secondary clutch plate through a small angular displacement in the opposite angular direction. Secondary clutch plate 15 again comes to rest after the force of the spring 27 has been spent. Electromagnetic coil 20 is again energized, during the second half wave of the alternating current cycle, thereby re-establishing the magnetic field in the interspace and again rotating clutch plate 15 in the same angular direction as clutch plate 14. Repetition of the aforedescribed sequence numerous times per second causes a series of rotational impulses to be set up in coupling shaft 25 and such impulses may be employed to perform various types of mechanical work as described hereinafter.

Although the foregoing description of this invention has specifically related to the use of actual springs to provide the restoring force after the de-energizing of the electromagnetic coil, it is apparent that such springs are not necessary where the actual loading characteristics of the system to be vibrated are such that a suitable restoring force is provided by the load itself or by the coupling to the load. Thus, in the vibration of a long section of steel rod, the flexibility of the steel rod is often such that further external restoring force is unnecessary.

Figure 2B:
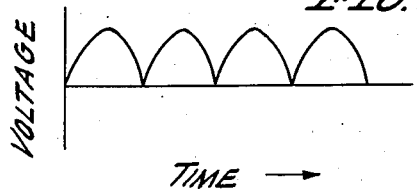

The various types of modulating currents which may be employed in the operation of the aforedescribed single clutch vibrational wave generator are shown in Figures 2a, 2b, 2c and 2d respectively. Figure 2a shows the usual sine wave type of alternating current. The sine wave current causes two excitations of the electromagnetic coil for each cycle of the current, i. e. with first excitation corresponding to the positive half of the sine wave and the second excitation corresponding to the negative half of the sine wave. Accordingly the sine wave current will produce a vibrational wave form which is twice the frequency of the exciting current. Figure 2b shows the type of wave form which can be obtained by double wave rectification of the sine wave form current of Figure 2a. A single sine wave form produces two wave forms of rectified current. Accordingly the single sine wave, upon rectification, yields a rectified wave which produces two excitations of the electromagnet per original sine wave. The frequency of the vibrational wave produced from a rectified current will be equal to the frequency of the rectified current or double the frequency of the parent sine wave current. A pulse type current shown in Figure 2c can also be employed in the invention, and like the sine wave and the rectified sine wave currents tends to produce a symmetrical wave form of vibrational energy.

In certain cases it is desired to produce an asymmetric vibrational wave form so that the velocity in one direction is appreciably greater than in the reverse direction. Such wave forms may be employed to agitate and move oil in oil-bearing formations, to move particles up an inclined plane, and the like. An asymmetric vibrational wave is produced by using an asymmetric modulating current for exciting the electromagnet in the foregoing wave generator, such as the asymmetric saw toothed wave form shown in Figure 2d. The saw toothed wave form current is easily generated by well known methods. Other asymmetric waves can be used similarly such as asymmetrically distorted sine waves and the like. The asymmetric vibration is obtained when the magnetic field is established at one rate and is collapsed at a different rate.

Referring now more particularly to attached Figure 3, a prime mover of the type described hereinbefore is employed to rotate shaft 40 thereby rotating gear 41 and a first disc-shaped primary clutch plate 42. Rotation of shaft 40 and gear 41 in a particular direction, e. g., clockwise, causes the reverse rotation of meshing gear 43 whereby attached shaft 44 is rotated in the opposite direction, e. g., counterclockwise. Shaft 44 also mounts a second disc-shaped primary clutch plate 45 which acts in opposition to the first primary clutch plate 42. A single partially rotatable disc-shaped secondary clutch plate 46, which is of relatively large diameter compared to first and second primary clutch plates 42 and 45 respectively, is suitably mounted on bearings so as to be partially rotatable through a small angular interval. A first part of the outer annular flat surface of the secondary clutch plate 46 faces, and is opposed to, a part of the outer annular flat surface of the first primary clutch plate 42; a second part of the annular flat surface of secondary clutch plate 46, which second part is diametrically opposite to the first part of such surface facing the first primary clutch plate 42, faces, and is opposed to, the outer annular flat surface of the second primary clutch plate 45. Both the first and second primary clutch plates 42 and 45 respectively, and the secondary clutch plate 46 are housed in a single clutch box 49 which is filled with magnetic clutch fluid 50. The clutch fluid fills the first interspace between the first primary clutch plate 42 and the first part of the secondary clutch plate surface and also fills the second interspace between the second primary clutch plate 45 and the second part of the secondary clutch plate surface. Shafts 40 and 44 enter fluid clutch box 49 through suitable packing glands, 47 and 48 respectively, which prevent leakage of the clutch fluid 50 from clutch box 49.

Secondary clutch plate 46 is attached to shaft 52 which passes out of clutch box 49 through packing gland 51. External to clutch box 49, shaft 52 is fitted with collar 53 which is attached to springs 54 and 55 respectively, which springs are in turn attached to rigid supports 56 and 57 respectively. Springs 54 and 55 respectively oppose the rotation of shaft 52 and provide a restoring force for any small angular displacement of shaft 52.

The part of the surface of the secondary clutch plate 46 opposing first primary clutch plate 42 is provided with an internal electromagnetic coil 58 whose electrical leads 59 and 60 pass through the secondary clutch plate 46 to hollow shaft 52 and through shaft 52 to a point outside of clutch box 49 where they emerge from the shaft and are attached to suitable sources of alternating electrical current not shown. The part of the surface of secondary clutch plate 46 opposing the second primary clutch plate 45 is fitted with an internal electromagnetic coil 61 whose electrical leads 62 and 63 pass through secondary clutch plate 46 to hollow shaft 52 whence they pass out of the clutch box 49 in a manner similar to that employed for the leads 59 and 60 of previously described internal electromagnetic coil 58. Internal electromagnetic coils 58 and 61 respectively are sufficiently separated so that they do not interact appreciably and the magnetic field of either coil has only a small magnetic effect at the general location of the other coil.

In the operation of this modification of the invention two separate alternating electrical currents which are of the same frequency, but out of phase, are impressed upon the two pairs of electromagnetic coil leads 59 and 60, and 62 and 63 respectively. The phase angle difference between the two separate electrical currents is such that the magnetic fields produced are about 180° out of phase. Two currents having sine wave voltage patterns and which are out of phase by about 90° will produce two periodic magnetic fields which are out of phase by about 180°. A suitable sine wave pattern of two currents which are out of phase by about 90° is shown in attached Figure 2e.

The rotation of the first primary clutch disc 42 causes a partial rotation of secondary clutch plate 46 about its axis through shaft 52 when electromagnetic coil 58 is energized, after which electromagnetic coil 58 is de-energized and electromagentic coil 61 is thereupon energized. Energizing of electromagnetic coil 61 causes clutch plate 46 to respond to the rotation of the second primary clutch plate 45 in the rotational direction counter to the previous rotation. Numerous periodic repetitions of this sequence wherein the secondary clutch plate 46 is moved through a small angular displacement first in one angular direction by first primary clutch plate 42 and thence in the opposite angular direction by second primary clutch plate 45 causes a rotational wave form motion to be set up in the system coupled to shaft 52, which wave form motion may be used to effect vibration of any desired coupled object. Where there is a positive movement of the load in both directions as in the present case, the springs 54 and 55 respectively serve mostly to make the motion more uniform and therefore they can be deleted if so desired.

Referring now more particularly to attached Figure 4, a first clutch box 70 is filled with magnetic clutch fluid 71 and houses a disc-shaped first primary clutch plate 72 and a disc-shaped first secondary clutch plate 73. The first secondary clutch plate 73 has a hollow cavity which is provided with an internal electromagnetic coil, not shown, for alternatingly establishing and collapsing a magnetic field in the first interspace between the first primary and first secondary clutch plates, 72 and 73 respectively, which interspace is filled with the magnetic clutch fluid. The internal electromagnetic coil of the first secondary clutch plate 73 is supplied by electrical leads 74 and 75, which leads are insulated and pass from the first clutch box 70 through insulator 76.

In a similar manner the second clutch box 80, which is filled with magnetic clutch fluid 81, houses a second primary clutch plate 82 and a second secondary clutch plate 83. The second secondary clutch plate 83 is similarly provided with an internal electromagnetic coil, also not shown, for alternatingly establishing and collapsing a magnetic field in the fluid filled second interspace between the second primary and the second secondary clutch plates, 82 and 83 respectively. The internal electromagnetic coil of the second secondary clutch plate 83 is supplied by electrical leads 84 and 85 respectively, which leads are insulated and emerge from the second clutch box 80 through insulator 86.

The first and second secondary clutch plates, 73 and 83 respectively, of the first and second clutch boxes, 70 and 80 respectively, are mounted on opopsite ends of a single drive shaft 90. Wheel 91 is mounted on shaft 90 near the midpoint and is external to both clutch boxes. In coaxial relationship to drive shaft 90, drive shaft 77 rotates the first primary clutch plate 72 of the first clutch box 70 in one angular direction while drive shaft 87 simultaneously and coaxially rotates the second primary clutch plate 82 of the second clutch box 80 in the opposite angular direction.

Referring now to attached Figure 5 in conjunction with Figure 4, wheel 91 on shaft 90 mounts eccentric pin 92 to which is connected one end of connecting rod 93. On the opposite end of connecting rod 93 is fitted wrist pin 94 to which is attached driving rod 95, the latter being attached to a vibrational wave energy consumer.

For the operation of the equipment separate sine wave form alternating electrical currents, which are of the same frequency but are out of phase by a phase angle of about 90°, are supplied separately to the two pairs of leads 74 and 75, and 84 and 85 respectively. The voltage relationship for two such suitable electric currents are shown in attached Figure 2e. As a result of alternating magnetization and demagnetization of each of the separate clutches by two periodic magnetic wave forms which are out of phase by a phase angle of about 180°, first secondary clutch plate 73, attached to shaft 90, is rotated in one angular direction through a small angular displacement until the magnetization in the first clutch collapses, and thereafter the second secondary clutch plate 83, also attached to shaft 90, is rotated in the opposite angular direction through approximately the same angular displacement by the magnetization in the second clutch. During the collapse of the magnetic field in the second clutch the magnetic field in the first clutch is reformed and the sequence is repeated. By such means wheel 91 is rotated through a small rotational angle first in one direction and then in another direction setting up a rotational wave form. The rotational forces acting on wheel 91 alternatingly raise and lower eccentric pin 92, which pin through connecting rod 93 raises and lowers wrist pin 94 and transmits a linear compressional wave pattern through shaft 95 to a suitable consumer of compressional wave energy.

In either of the two types of positive-action double-clutch wave generators, described hereinbefore in connection with Figures 3 and 4, it is preferable to employ two modulating currents which are out of phase by a phase angle $\theta$ wherein $\theta$ is 90° ($\pi/2$ radians) for a double valued alternating current, e. g. a sine wave form, and wherein $\theta$ is 180° ($\pi$ radians) for a single valued periodic current. These respective values for $\theta$ normally give a symmetric wave form vibration wave where the two currents are of the same magnitude and the equipment is generally symmetrical. It is apparent, however, that the currents having different frequencies and/or a phase angle difference ($\theta$) other than those described hereinbefore. The vibration waves obtained thereby can have beat frequencies and/or can be asymmetrical depending upon the particular relationships. It is apparent that where the frequency is the same for both currents, the phase angle $\theta$ cannot be 0 and should be appreciably different from 0 such as at least 45° ($\pi/4$ radians) or higher.

Referring now more particularly to attached Figure 6, a magnetic clutch housed in clutch box 100 operates in the manner described hereinbefore in connection with attached Figure 1. A suitable prime mover, not shown, is coupled to drive shaft 101 and thereby rotates attached primary clutch plate 102. An alternating electric current supplied to electrical leads 104 and 105 respectively, which are in turn connected to an internal electromagnetic coil within secondary clutch plate 103 and a periodic magnetic field is thereby established and collapsed in the interspace between the primary and secondary clutch plates 102 and 103 respectively, whereby an undulating rotational motion is imparted to secondary clutch plate 103. The undulating rotational motion of secondary clutch plate 103 is transmitted to shaft 106 to which is attached wheel 107. Wheel 107 is provided with eccentric loading pin 108 and connecting rod 109, wrist pin 110 and driving rod 111 which are interconnected in the manner described previously in connection with Figure 5. The undulating angular rotation of wheel 107 is thereby transformed to a vertical linear reciprocating motion which is transmitted through shaft 111.

Bore hole 112 is drilled through miscellaneous earth formations 113 to within, or in the vicinity of, oil-bearing sands. Shaft 111 runs to near the bottom of bore hole 112 and is fitted at the bottom with flat circular plate 114. The portion of the bore hole surrounding circular plate 114 is filled with a solidified mass 115 of plastic, concrete or other such solid substances, or with any suitable liquid such as water, petroleum and the like. The vertical reciprocating motion of shaft 111 in response to the magnetic field variations set up in the magnetic clutch are transmitted longitudinally downwardly through shaft 111 to flat circular plate 114 wherefrom they are radiated throughout the surrounding solid or liquid into, or toward, the oil-bearing sands in the proximity thereof.

Referring now more particularly to attached Figure 7, a vertically disposed single clutch vibrational wave generator of the general type shown in Figure 1 is employed to vibrate an oil-bearing formation. A suitable prime mover, not shown, is used to rotate drive shaft 120 on which is mounted worm gear 121. Worm gear 121 in turn drives ring gear 122 mounted on drive shaft 123 at a substantially constant speed. Drive shaft 123 is suitably supported on bearings by means not shown. Rotation of drive shaft 123 causes the rotation of attached disc-shaped primary clutch plate 124 which is in close spacial relationship to coaxially mounted, disc-shaped secondary clutch plate 125. Primary and secondary clutch plates, 124 and 125 respectively, are bathed in magnetic clutch fluid 126 and the fluid fills the interspace therebetween. An alternating electrical current is supplied through leads 127 and 128 to an electromagnetic coil enclosed within secondary clutch plate 125 thereby establishing and alternating magnetic field in the interspace between primary and secondary clutch plates 124 and 125 respectively. The alternating magnetic field causes a rotational wave form vibration to be set up in drive shaft 129.

Bore hole 130 is drilled through miscellaneous earth formations 131 to within, or in the vicinity of, oil-bearing sands. Drive shaft 129 passes downwardly from secondary clutch plate 125 through a suitable packing 133 which prevents loss of magnetic clutch fluid 126 and through the bore hole 130 to near the bottom wherein it mounts several horizontal fins or arms 129a. The space surrounding the bottom of the bore hole and the bottom of drive shaft 129 and attached fins 129a is filled with solidified plastic mass 132, or with a suitable liquid, of the types described hereinbefore in connection with attached Figure 6. The rotational wave form energy generated in the drive shaft 129 is transmitted downwardly through the bore hole to plastic mass or liquid 132 wherefrom it is radiated into, or toward, oil-bearing sands in the proximity thereof.

Either of the two foregoing methods for shaking oil-bearing formations serves to increase the yield of oil which can be obtained from such oil-bearing formation and is effective when either primary or secondary recovery operations are in progress. While the description of the two methods has been limited to the use of alternating currents, it is apparent that other periodic currents of the types described hereinbefore, or others, may be so employed. Where the vibrational waves are transferred to a fluid at the bottom of the bore hole and are thereafter transmitted to the oil-bearing sands, such fluid may be connate water, petroleum or mixtures thereof with suitable means being provided for removing the oil flowing into the pool at the bottom of the bore hole undergoing vibratory treatment. In another modification one or more bore holes may be employed solely as radiation points for vibrational wave energy without any regard to effecting oil flow from the immediate vicinity toward the radiation source. Where the bore hole serves only as a radiation source, a plastic mass is conveniently employed for effecting the acoustical coupling between the wave energy transmission shaft and the earth formation. In this case the oil-bearing formation is vibrated and the oil is thereby caused to flow more easily toward a production well which may be separated from the bore hole undergoing vibration by some distance. In another modification the oil-bearing formation may be undergoing water flooding or gas drive wherein the water or gas is injected in an injection well and the oil is produced from an output well. The wave generator may be coupled to the formation through either the input well or the output well, or through a separate well utilized only for vibratory purposes. Such coupling may be made through the water or gas in the injection well, through the oil in the output well, or through a solid or liquid coupling in the case of a separate vibratory well of the types described hereinbefore.

Applications of acoustic wave energy for vibrating oil-bearing formations during secondary recovery operations are described in copending application Serial No. 44,073 titled "Recovery of Hydrocarbons" to John E. Sherborne, filed August 13, 1948, now U. S. Patent No. 2,670,801. The wave generator of this invention may be employed as the wave generator for the purposes described therein.

While the two foregoing methods have employed single clutch wave generators to shake oil-bearing formations, it is also apparent that the double clutch wave generators of either of the two types described hereinbefore may be similarly employed.

While many applications of the vibrational wave generator of this invention employ one or two sine waves of electrical currents for exciting one or two magnetic fields, certain other wave form currents may be employed to generate asymmetric compressional waves. Such asymmetric vibrations may be used to vibrate oil-bearing formations in the manner described hereinbefore.

Figure 2D:
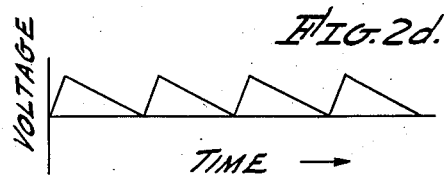

In attached Figure 8 is shown another method for utilizing asymmetrical rotational vibration waves. Wave energy of this type can be generated by the compressional wave generator shown in Figure 1 wherein a saw tooth wave of the type shown in Figure 2d is employed to couple and uncouple the load source.

Referring now more particularly to attached Figure 8, hopper 140 feeds solids on to vibrating conveyor 141 which is eccentrically coupled through pin 142 to wheel 143 mounted on axle 144. Axle 144 is, for example, coupled to drive shaft 25 of previously described compressional wave generator of Figure 1 wherein an asymmetric wave form electrical amount of the type shown in Figure 2d is employed as the modulating electric current. The vibration of conveyor 141 is such that there is a more rapid motion in the direction toward the hopper and a less rapid motion toward the top of conveyor 141. Under such circumstances solids flowing from hopper 140 on to conveyor 141 are transferred up the conveyor by virtue of their inertia on the rapid downward stroke. Flowing solids flow up the conveyor 141 and flow on to pile 145.

The wave generators of this invention may be employed to generate waves over a wide range of frequency, including the entire sonic range, by proper selection of the current frequency. Thus, the wave generators are preferably used for, and are very effective for, producing vibrations in the range of 10 to 100 cycles/second when single valued periodic currents of 10 to 100 cycles/second or when double valued or alternating currents of 5 to 50 cycles/second are employed. The wave generators may be used to generate waves in the range of 100 to 2000 cycles/second by using single valued currents of 100 to 2000 cycles/second or double valued currents of 50 to 1000 cycles/second. The wave generators can also be used to generate higher frequencies, such as in the range of 2000 to 25,000 or more cycles/second, by the selection of single valued currents of corresponding frequency or by the selection of double valued currents whose frequency is one-half of the desired vibration frequency.

When the frequency of the output of the wave generator is in the upper ranges, there is often an appreciable heating of the clutch fluid, electromagnet, and other parts of the wave generator. Suitable provision can be included, if desired, to cool such parts such as by refrigeration.

In the foregoing description of this invention the magnetic field has been established and collapsed by the action of a periodic current upon an electromagnet. It is apparent that such establishing and collapsing can be effected by other means such as by periodically passing a permanent magnet into and out of place so that its magnetic field is periodically established and collapsed in the magnetic clutch fluid within the interspace.

Whereas the electromagnetic coils are preferably mounted within the partially rotatable secondary clutch plate, because of the fact that this arrangement eliminates the need for commutators to carry the electric current to the coil, it is apparent that the electromagnet can be mounted within the primary clutch plate or elsewhere provided it can be and is supplied with current and provided that the resulting magnetic field is active in the interspace between the primary and secondary clutch plates.

In the foregoing descriptions of this invention the primary driving member and the secondary driven member have been disc-shaped primary and secondary clutch plates respectively. It is apparent that in either the single clutch wave generator of Figure 1, or in the double clutch generator of Figure 4, two concentric figures of revolution, which are coaxially mounted, may be employed either as the driving and driven members, or as the driven and driving members respectively. Thus, the primary and secondary clutch plates may be concentric sections of spheres or of other conical sections of revolution, concentric cones, concentric cylinders, or various combinations of the foregoing. In the modification shown in Figure 3 the two driving members and the driven member are preferably disc-shaped. However, other shapes may be used. For example, sections of the driven member or secondary clutch plate which are displaceable through only a small angular displacement, can be projected through a suitable opening into the inside of each of the hollowed rotating driving members. The driving members may be sections of the aforedescribed figures of revolution with the projected sections of the driven member comprising or approximating parts of such figures.

In the foregoing description of this invention it is apparent that the interspace, as determined by the distance between the normally coaxially mounted driving and driven members, is necessarily limited. The interspatial distance cannot be zero and neither should it be excessive. Normally small distances are preferred such as those which are greater than zero and less than 0.5 inch. The distance is usually in the range of 0.05 inch for example.

In other modifications the wave generator of this invention may be employed as the source of sonic vibrations in order to effect pumping as described in United States Patent 2,355,618, of August 15, 1944, to A. G. Bodine, or as in United States Patent 2,428,460, of October 7, 1947, to W. S. Englis. The wave generator may also be employed to effect drilling as in United States Patent 2,424,108, of July 15, 1947, to Eugene Merten by providing a source of sonic vibrations to produce the hydraulic ramming.

It is apparent that many modifications of this invention may be made by those skilled in the art without departing from the spirit and the scope of the following claims.

I claim:

1. In a method for vibrating an oil-bearing formation wherein intensive wave energy in the sonic frequency range is generated at the earth's surface and is transmitted to a subsurface oil-bearing formation, said wave energy being of sufficient magnitude to vibrate a substantial portion of said formation and cause an increased flow-rate of interstitial fluid therethrough, the improved method for generating and transmitting said wave energy which comprises disposing a transducer in said formation, resiliently coupling said transducer to the driven member of a magnetic fluid clutch, rotating the driving member of said magnetic clutch by means of a power source capable of applying a strong momentary torque to said driving member, and alternately magnetizing and demagnetizing the fluid of said magnetic clutch at a rate greater than about 10 cycles per second by means of a pulsating electrical current, the magnetizing power supplied to said clutch fluid being substantially less than the torque-producing power supplied to said driving member, and controlled in periodicity and wave form whereby said transducer is caused to vibrate by the alternate coupling and uncoupling of said driving member and said driven member to apply such controlled vibrations to the formation.

2. A method as defined in claim 1 wherein the voltage pattern of said pulsating electrical current is non-sinusoidal.

3. A method as defined in claim 1 wherein the voltage pattern of said pulsating electrical current is an asymmetrical wave form so that the rate of said magnetizing of clutch fluid is unequal to the rate of said demagnetizing thereof.

4. A method according to claim 1 wherein the voltage pattern of said pulsating electrical current is a single-valued, symmetrical periodic wave form.

5. An apparatus adapted for vibrating an oil-bearing formation with intensive wave energy in the sonic frequency range comprising in combination a subterranean transducer, an elongated metal coupling resiliently connecting said transducer with a partially rotatable driven member of a magnetic fluid clutch located on the earth's surface, a rotatable driving member disposed in said magnetic clutch, supporting means for maintaining a narrow interspace between said driving member and said driven member, a magnetic clutch fluid consisting of a non-magnetic oil and about 2% to 40% by weight of finely-divided magnetizable solids disposed in said interspace, means disposed near said interspace for alternately magnetizing and demagnetizing said clutch fluid, and motive means for rotating said driving member.

6. An apparatus as defined in claim 5 wherein said metal coupling is connected axially to said driven member, whereby torsional vibrations may be supplied to said transducer.

7. An apparatus as defined in claim 5 wherein said metal coupling is connected to said driven member through a wrist pin, a link, and an eccentric pin, whereby vertical reciprocating vibrations may be supplied to said transducer.

8. An apparatus adapted for vibrating an oil-bearing formation with intensive wave energy in the sonic frequency range comprising in combination a subterranean transducer, an elongated metal coupling resiliently connecting said transducer with a partially rotatable driven member of a magnetic fluid clutch located on the earth's surface, a first rotatable circular driving member positioned in said clutch with only a peripheral segment thereof in close spaced relationship to a peripheral segment of said driven member, thereby forming a first interspace between said members, a second rotatable circular driving member positioned in said clutch with only a peripheral segment thereof in close spaced relationship to a peripheral segment of said driven member, thereby forming a second interspace between said members, a magnetic clutch fluid consisting of a non-magnetic oil and about 2% to 40% by weight of finely-divided magnetizable solids disposed in said first and second interspaces, a first electromagnet disposed near said first interspace for alternately magnetizing and demagnetizing the clutch fluid in said first interspace, a second electromagnet disposed near said second interspace for alternately magnetizing and demagnetizing the clutch fluid in said second interspace at intervals non-coincident with the magnetizing-demagnetizing of said first interspace fluid, and motive means for rotating said driving members in opposite directions.

9. An apparatus adapted for vibrating an oil-bearing formation with intensive wave energy in the sonic frequency range comprising in combination a subterranean transducer, an elongated metal coupling resiliently connecting said transducer with each of the driven members of two magnetic fluid clutches located on the earth's surface, a first rotatable driving member disposed in one of said clutches and spaced a short distance from its respective driven member thereby forming a first interspace, a second rotatable driving member disposed in the other of said clutches and spaced a short distance from its respective driven member thereby forming a second interspace, a magnetic clutch fluid consisting of a non-magnetic oil and about 2% to 40% by weight of finely-divided magnetizable solids disposed in said first and second interspaces, a first electromagnet disposed near said first interspace for alternately magnetizing and demagnetizing the clutch fluid in said first interspace, a second electromagnet disposed near said second interspace for alternately magnetizing and demagnetizing the clutch fluid in said second interspace at intervals non-coincident with the magnetizing-demagnetizing of said first interspace fluid, and motive means for rotating said driving members in opposite directions.

References Cited in the file of this patent

UNITED STATES PATENTS

| | | |
|---|---|---|
| Re. 23,381 | Bodine | June 26, 1951 |
| 1,672,807 | Etzel | June 5, 1928 |
| 2,025,123 | Rahbek | Dec. 24, 1935 |
| 2,184,809 | Brammer | Dec. 26, 1939 |
| 2,248,495 | Dupy | July 8, 1941 |
| 2,342,116 | Broekhuysen | Feb. 22, 1944 |
| 2,344,450 | Page | Mar. 14, 1944 |
| 2,417,850 | Winslow | Mar. 25, 1947 |
| 2,437,456 | Bodine | Mar. 9, 1948 |
| 2,479,986 | Thomas | Aug. 23, 1949 |
| 2,490,044 | Garbarini et al. | Dec. 6, 1949 |
| 2,519,449 | Findley | Aug. 22, 1950 |
| 2,525,571 | Winther | Oct. 10, 1950 |
| 2,573,065 | Salemme | Oct. 31, 1951 |
| 2,575,360 | Rabinow | Nov. 20, 1951 |
| 2,661,825 | Winslow | Dec. 8, 1953 |
| 2,667,932 | Bodine | Feb. 2, 1954 |

OTHER REFERENCES

Product Engineering, February 1949, page 127.